United States Patent [19]
Tani et al.

[11] Patent Number: 6,074,284
[45] Date of Patent: Jun. 13, 2000

[54] COMBINATION ELECTROLYTIC POLISHING AND ABRASIVE SUPER-FINISHING METHOD

[75] Inventors: Kazunori Tani, Singapore, Singapore; Kohichi Kawachi, Osaka, Japan

[73] Assignee: Unique Technology International PTE. Ltd., Singapore, Singapore

[21] Appl. No.: 09/299,230

[22] Filed: Apr. 23, 1999

Related U.S. Application Data

[63] Continuation of application No. PCT/SG97/00051, Oct. 3, 1997.

[30] Foreign Application Priority Data

Aug. 25, 1997 [JP] Japan ..................................... 9-226923

[51] Int. Cl.$^7$ ...................................................... B24B 1/00
[52] U.S. Cl. ................................ 451/57; 451/28; 451/34; 451/908
[58] Field of Search .................................. 451/57, 28, 36, 451/37, 38, 41, 60, 54, 65, 908, 34

[56] References Cited

FOREIGN PATENT DOCUMENTS

| | | |
|---|---|---|
| WO8800871 | 2/1988 | WIPO . |
| WO9314249 | 7/1993 | WIPO . |

OTHER PUBLICATIONS

Database WPI on Questel, week 9325, London: Derwent Publications Ltd., AN 93–201550, Class L03, JP 51–28506 A (Matsushita Elec Ind. Co., Ltd.), abstract.
Louis S. Winter, "Electro–Polishing", Metals Handbook, 9$^{th}$ Ed., vol. 5, American Society for Metals, 1982, pp. 303–309.
Bharat Bhushan, "Magnetic Slider/Rigid Disk Substrate Materials and Disk Texturing Techniques —Status and Future Outlook", Advances in Information Storage Systems, vol. 5, 1993, pp. 175–209.

*Primary Examiner*—Derris Holt Banks
*Attorney, Agent, or Firm*—Baker Botts L.L.P.

[57] ABSTRACT

An abrasive super-finishing method for workpieces, such as metallic thin-film magnetic discs, employs a polishing/texturing material having a backing, such as synthetic resin film or woven material or non-woven cloth, and a layer which can hold abrasive grains on the backing, such as flocked fibre or a porous polymer foam, on one surface of the backing. An electrolytic solution in which abrasive grains are suspended is supplied to the polishing/texturing material to conduct polishing or texturing of the workpiece surfaces. The workpiece is connected to an anode and a pressure roller or a cathode bar is connected to a cathode. A voltage is applied between the workpiece and the pressure roller or cathode bar to conduct simultaneously electrolytic polishing and abrasive polishing/texturing.

8 Claims, 3 Drawing Sheets

COMBINATION ELECTROLYTIC POLISHING AND ABRASIVE SUPER-FINISHING METHOD

CROSS-REFERENCE TO RELATED APPLICATION

This is a continuation of copending International application No. PCT/SG97/00051 filed Oct. 3. 1997.

TECHNOLOGICAL FIELD OF INVENTION

This invention relates to super-finishing of metallic surfaces, and in particular relates to combined electrolytic polishing of metallic surfaces and mechanical super-finishing with an abrasive.

PRIOR ART

Hard disks, that is metallic, thin-film magnetic disks, are generally magnetic memory media with a magnetic layer on the surface of an aluminum disk board; but with constant hopes for further improvement in the memory density there is the impending necessity for a reduction in the distance between the magnetic head and magnetic disk. Bringing both of these surfaces to a smooth, mirror-like finish, however, creates excessive contact areas between the magnetic head and the magnetic disk when the magnetic disk device stops, obstructing smooth running of the magnetic head when the device starts up or before it stops, and giving problems to the magnetic head upon start up in particular. To deal with this problem, polishing and texturing is generally conducted in which filament print of ridges and grooves is created through texturing after the surface of the disk board has been polished smooth. The polishing process is performed by supplying a polishing cloth with a polishing solution that contains abrasive grains to bring the surface of the disk board to a planar mirror-like surface. The texturing process uses items such as tape and pad which has polishing grains fixed in its surface, or buffs impregnated with slurries which contain polishing grains to form approximately concentrically circular filament print on the surface of the disk board; polishing leaves random process marks on the disk surfaces but texturing removes the random polishing marks but leaves basically concentric process marks. To achieve ensured smooth running of the disk and high memory density, polishing and texturing must be performed so as there are no abnormal protrusions on the surface, and the ridges and grooves are accurate and even. In normal polishing and texturing with abrasive grains, however, deep ridges and large protrusions are frequently formed, leading to read-write errors and problems with the floating stability of heads in these areas.

PROBLEMS THE INVENTION SEEKS TO SOLVE

The task for this invention is to create disk boards with surface properties whereby the surface has no protrusions, the surface roughness, Ra (average roughness of concentric lines) is no more than 10 Å and the maximum surface roughness Rmax (the maximum height of surface protrusions) is no more than 50 Å. To achieve this, it is necessary to both process the surface of the disk board to a high-precision mirror finish, and create grooves of uniform depth in that surface. Boards are generally polished to a superior mirror finish by using finer polishing agents, but this leads to reduced processing efficiency and poor productivity. Furthermore, once a large processing mark, or scratch is made, its removal reduces processing efficiency and requires significant amounts of processing time. As far as texturing is concerned, it is difficult to improve surface properties through mechanical means. Other issues that this invention seeks to address is the improvement of processing efficiency and the expediting of the production of uniform surface finish.

MEASURES FOR SOLVING THE PROBLEMS

In addressing the aforementioned problems, the inventors of this invention have removed the minute protrusions that occur when polishing with grains and when forming process marks, and burrs that occurs when processing, by utilising the action of electrolytic polishing in concurrence with polishing or texturing with the concept of producing a smooth processed board with no abnormal protrusions; that is to create superior texture patterns on highly polished mirror-finish boards. This invention is the result of repeated experiments, evaluations and investigations.

In other words, the substance of this invention is: a method of super-finishing metallic surfaces of a workpiece with a mixed solution of processing solution and electrolyte (which contains abrasive grains) supplied between the workpiece (which acts as an anode), the cathode (which is placed proximate to the workpiece to conduct electrolytic polishing) and the polishing tape or pad; electric current is passed to the workpiece and the cathode via the electrolytic solution, and electrolytic polishing and polishing or electrolytic polishing and texturing are conducted simultaneously.

Furthermore, the cathode may be positioned on the processing side of the tape, on the reverse side of the surface being processed or on the backing side of the tape. The backing of the polishing material may be synthetic resin film, woven material, or non-woven cloth, or materials that provide conductivity to these materials, and has a surface on one side of flocked fibres or a porous, synthetic resin foam which have means for holding polishing grains. In devices in which the cathode is positioned on the reverse side of the tape, non-conductive liquid-permeable tapes are used. Confirmation was made that through the use of this invention's method, processes were simplified, surface finish was superior to those produced with the method that conducts electrolytic polishing and polishing, or electrolytic polishing and texturing separately, and processing efficiency was boosted significantly.

The most significant feature of this invention is that the addition of electrodes (cathodes) to the polishing and texturing device allows for the simultaneous and parallel conducting of mechanical polishing/and texturing, and electrochemical polishing by combining electrolytic solution with polishing or texturing solution and passing a current to the workpiece through the solution. The electrode (cathode) is formed by placing a cathode roller or cathode bar (FIG. 3) on the processing side of the polishing tape or pad in proximity to the surface being processed. Alternatively, the pressure roller on the reverse side of the tape may act as a cathode as in FIG. 1. It is also possible to have the tape itself act as a cathode by using a conductive backing for the polishing and texturing tape and ensuring the tape's structure allows the passage of electrolytic solution. Another way of forming a cathode is to place a metallic tape on the reverse side of a liquid-permeable tape and moving them along together. In all cases, it is essential that the workpiece surface and the electrode (cathode) be joined together by the electrolytic solution.

Synthetic resin film is useful as the backing for the combination electrolytic polishing and polishing/texturing material in this invention and can be used for either polishing or texturing. A typical example of this is 100–200 μm thick polyethylene terephthalate (PET) film, in which holes may be punched in a specific pattern as necessary. Film to be used may be selected from materials which have the necessary mechanical strength, and which can withstand environmental conditions including electrolytic solution.

All types of woven material and non-woven cloth are also useful as the backing for the polishing/texturing material. Some of the liquid-permeable textiles include loose-weave woven material, knitted material, non-woven cloth, materials that have internal space, or comparatively densely-woven material and non-woven cloth in which holes may be punched. Textiles may be chosen with discretion as long as they have sufficient mechanical strength and chemical resistance, with polyester textiles being particularly suited.

Electroless-plated woven material or non-woven cloth can be used as conductive backing for the polishing/texturing material. According to the composition of the electrolytic solution, copper and nickel are preferred metals for electroless plating. Alternatively, it is possible to have conductive fibre, such as metal fibre, textile blended, mixed fibre, mixed weave or mixed knit. Or in place of this, form a metal layer on the surface of the synthetic resin film. To provide conductivity to synthetic resin film, various methods can be used, including electroless plating, vaporisation, sputtering and other methods. It is preferred that the electrical resistance of the conductive part of the backing of the tape be not higher than $1\times10\Omega$.

The polishing and texturing tape is generally cut into strips 35–89 mm wide, but it may be cut as pads to fit the size of the polishing and texturing wheels.

Either the entire surface, or most of the surface, of one side of the polishing/texturing material is covered with a layer which has means for holding polishing grains. Diamond, alumina or other granules of an average diameter of no more than 1 μm are used as the abrasive grains, with these being dispersed in a suspension liquid, combined with electrolytic solution, and supplied to the space between the workpiece that is being rotated and polished and the polishing/texturing material which runs in contact with the workpiece. Surface structures which will temporarily hold abrasive grains in the polishing/texturing material surface to allow effective abrasive finishing, that is polishing or texturing of the workpiece surface at this time include porous synthetic polymer foams or flocked surfaces.

The flocking process involves pre-coating the surface into which fibres will be flocked with a binder resin, flocking extremely short fibres on this surface through the use of static electricity, and fixing them in place with the binder resin. Fibres for flocking include polyamide, polyester, acrylic and other fibres which do not readily conduct electricity and are not affected by electrolytic solution, with fibres of no more than 1 denier and no longer than 1 mm being well suited. A base resin of acrylic ester emulsion blended with epoxy resin and a catalyst as a cross-linking agent can be used as an appropriate binder, but this is not the only possibility. When flocking is done to a specific pattern, methods such as the rotary screen method are used to print the binder resin in the pattern. The entire surface may simply be coated when the backing of the polishing/texturing material has already had a pattern of holes punched in it.

For the porous synthetic resin foam, a porous layer is formed of a synthetic resin such as polyurethane, polyvinyl chloride, polyethylene, polystyrene and polyvinyl former using a known foaming agent and foaming conditions so as to make the surface porous apart from the outermost layer. Such methods as the rotary screen method mentioned above for specific patterns may be used.

When using conductive backing for tape and cathode on the reverse side of the tape, it is preferable that the electrical resistance in the direction of the thickness of the polishing/texturing tape is at least $1\times10^4\Omega$, in the flocking or in the porous resin. This is because when this layer has good conductivity, a short circuit is formed between the electrode and the workpiece, current ceases to flow in the electrolytic solution, and electrolytic polishing is interrupted.

To ensure that there is no unevenness in the surface which is being polished or textured, it is necessary to choose an orientation of the pattern of flocking/porous polymer created to ensure a mostly uniform contact area can be obtained in the width direction of the surface of the workpiece vis-a-vis the running of the polishing/texturing tape.

SUMMARY

In the polishing and texturing processes of a metallic surface using polishing material in this invention, the workpiece acts as the anode, a cathode is positioned close to the surface of the workpiece to conduct electrolytic polishing, and a mixed solution of combined electrolytic solution and processing solution is present between, and in contact with, the workpiece surface, polishing material and the cathode, and electric current is passed to the cathode and the workpiece via the electrolytic solution; in doing so it is possible to conduct electrolytic polishing simultaneously with polishing/texturing, resulting in a significant improvement in surface finish, such as smoother processed surfaces and greater uniformity of texturing, and also a significant improvement in process efficiency.

BRIEF DESCRIPTION OF FIGURES

FIG. 2 2(a) and 2(b) are cross-sectional diagrams illustrating the features of the combined electrolytic polishing and abrasive super-finishing material.

DESCRIPTION OF EMBODIMENTS

The embodiments of this invention will be illustrated with surface super-finishing examples.

Figure 1:
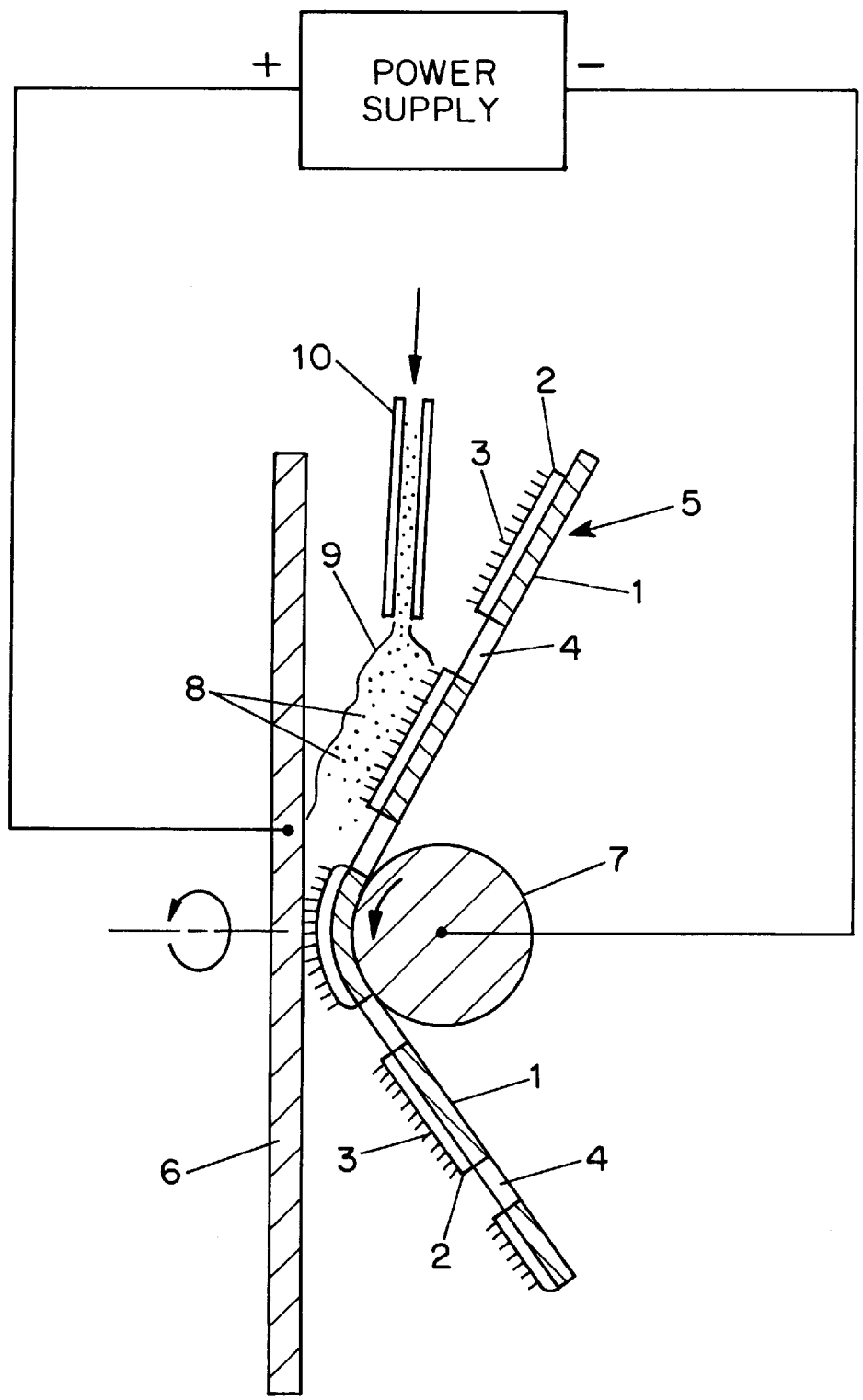
FIG. 1 A schematic cross-sectional diagram of one embodiment of the combined electrolytic polishing and abrasive super-finishing method.

FIG. 1 illustrates the combination process of abrasive polishing/texturing and electrolytic polishing using this polishing/texturing tape (5). The polishing/texturing tape (5) runs along in contact with a rotating workpiece (6), with a metallic pressure roller (7) pressing the tape (5) against the surface of the workpiece from behind. A continuous flow of the mixed solution (9), comprising the electrolytic solution and polishing/texturing solution that contains suspended abrasive grains (8), is supplied from the solution-supplying nozzle (10) via a supply method not shown in the FIGURE, to the area between the rotating workpiece (6) and the running polishing/texturing tape (5). The workpiece (6) is connected to the anode through the workpiece clamp (not shown in the FIGURE) while the pressure roller (7) is connected to the cathode, and a voltage is applied between the workpiece (6) and the pressure roller (7) via a power supply shown schematically in FIG. 1, to conduct simultaneous polishing/texturing and electrolytic polishing.

Figure 2A:
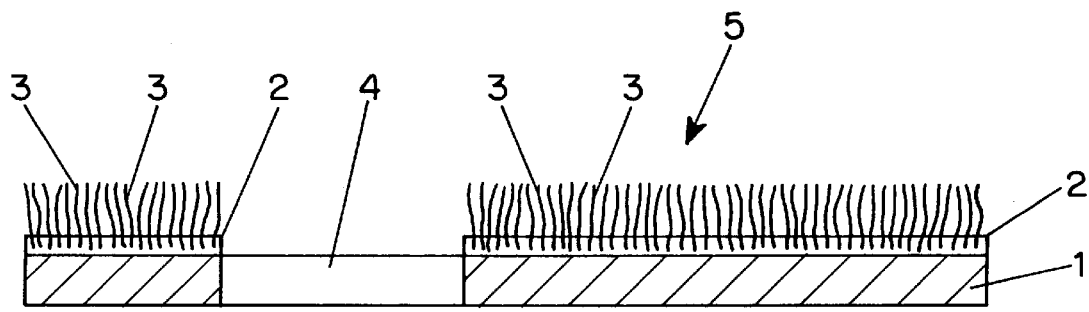

As shown in FIG. 2(a), flocked texture tape is made by passing a substantially 150 μm thick piece of polyethylene terephthalate (PET) film as tape backing (1) through an electrostatic flocking device, coating it with an acrylic ester emulsion-type binder (2) in the coating part, flocking it with fibres (3) of substantially 0.5 denier in diameter, 0.3 mm long polymer and heat-curing to fix the fibres. Holes (4) may be punched in the flocked polishing/texturing material. The film is finally cut into strips, for example, of substantially 37 mm in width to make texturing tape (5).

Figure 2B:
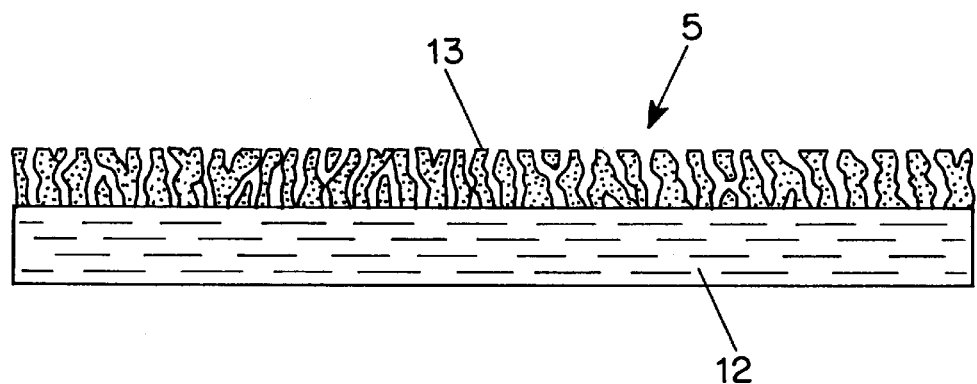

As shown in FIG. 2(b), the polishing/texturing material (5) is made of porous backing (12), comprising woven or non-woven cloth, with porous synthetic resin foam (13) fixed on the backing.

The backing of the conductive polishing/texturing material (5) can be made of non-woven polyester fibre, for example, and electrolessly plated with copper using the usual method and further electrolessly plated with nickel. This sheet is then passed through an electrostatic flocking device, coated with an acrylic ester emulsion-type binder in the coating part, flocked with fibres of substantially 0.5 denier, 0.3 mm long polymer, and heat-cured to fix the fibres. When this conductive polishing/texturing tape (5) is used, the pressure roller (7) that connects to the cathode presses the polishing/texturing tape (5) against the workpiece (6). Alternatively, the polishing/texturing tape (5) itself can also be connected to the cathode when the pressure roller is made of rubber, and produces equally superior results.

Figure 3:
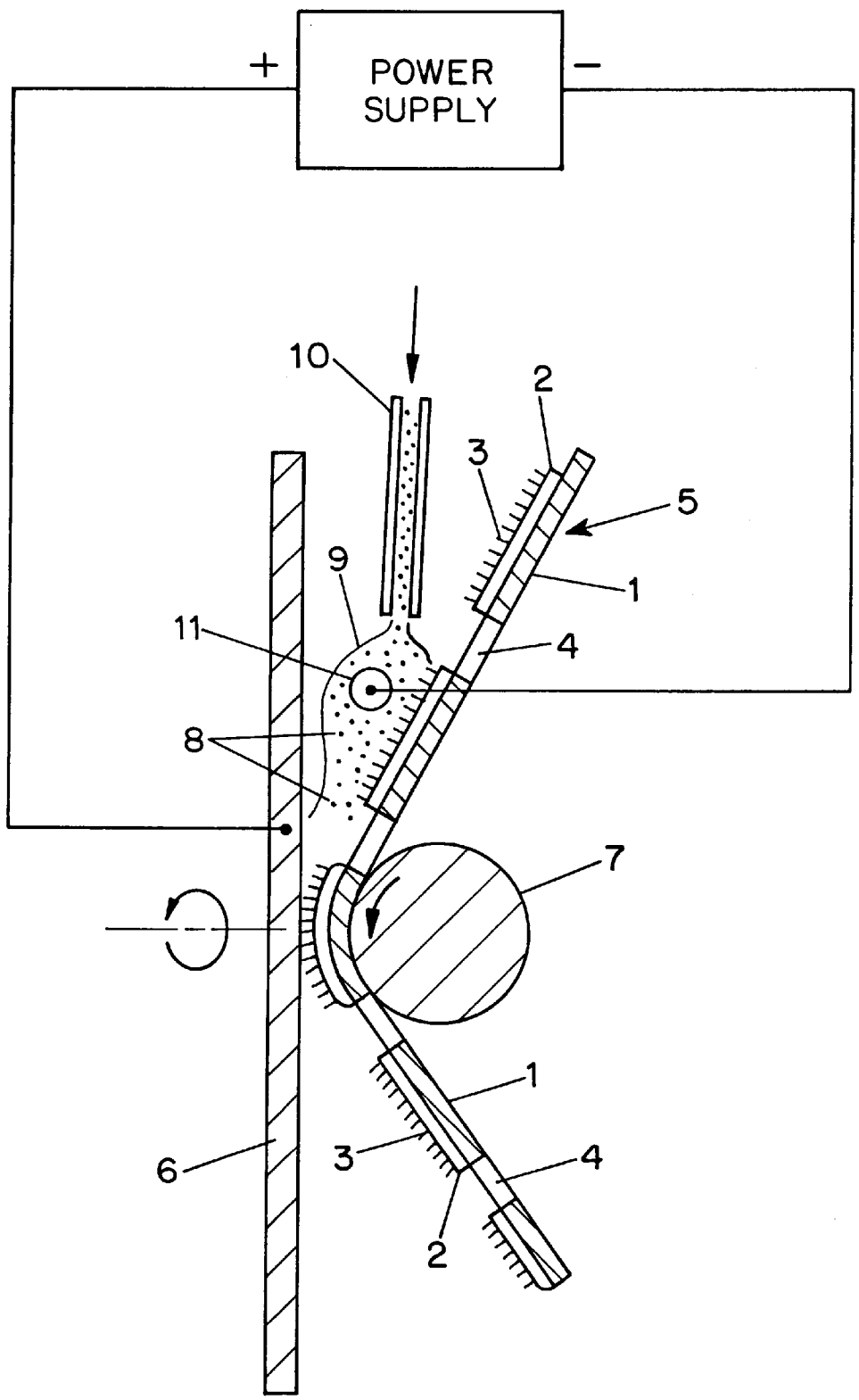
FIG. 3 A cross-sectional diagram of other embodiment of the combined electrolytic polishing and abrasive super-finishing method.

FIG. 3 shows a different simultaneous process. In this example, an electrode referred to as cathode bar (11) is set in a position close to the front process side of the polishing/texturing tape (5), with the cathode rod bar (11) and the surface being processed of the workpiece being connected by electrolytic solution (9). Results of processing with this composition embodiment were similar to those in the previous embodiment.

While the above description contains many specificities, these should not be construed as limitations on the scope of the invention, but to explain the principle. Other variations are also possible for those skilled in the art of polishing. For example, by having a surface finishing plate which is translated in a plane relative to the workpiece, polishing of a large planar surface is easily carried out, such as in the super-finishing of stainless steel sheets. Polishing of a spherical surface, or any surface of revolution, can also be easily implemented.

Measurement of surface properties of disk boards processed in the aforementioned manner gave surface roughness, Ra as less than 7 Å, and maximum surface roughness Rp, as substantially 100 Å, which are naturally far superior in comparison to the values of 20 Å and 200 Å, respectively, obtained when only mechanical texturing was conducted, and markedly better results were able to be obtained in a short period of time than when normally conducting texturing and polishing over two stages. In all the embodiments of this invention, material removal rate of this combined electrolytic polishing and abrasive super-finishing process is significantly higher than the conventional process, thus reducing the process time and, therefore, increasing both the process efficiency and productivity.

EFFECT

This invention's combination electrolytic polishing and polishing/texturing method and the polishing/texturing material used enable simultaneous abrasive polishing and electrolytic polishing, or abrasive texturing and electrolytic polishing, resulting in superior surface finish with one-stage processing, compared with the surface finish obtained with the conventional two-stage processing methods (that is, separate implementation of electrolytic polishing and polishing, or separate implementation of electrolytic polishing and texturing); that is grooves and ridges are even, and there are no abnormal protrusions. The efficient supply of hard disks without the occurrence of read-write (R/W) errors has, therefore, become possible.

We claim:

1. A combination electrolytic polishing and abrasive super-finishing method, comprising the steps of:
   (a) engaging a metallic surface of a workpiece with a polishing/texturing material;
   (b) connecting said metallic surface to an anode;
   (c) placing a cathode in proximity to said metallic surface;
   (d) supplying a mixed solution of electrolytic polishing solution containing abrasive grains to said metallic surface, to said polishing/texturing material and to said cathode; and
   (e) delivering an electrical current to said metallic surface and said cathode through said mixed electrolytic solution while carrying out electrolytic polishing and abrasive super-finishing simultaneously.

2. The method according to claim 1, wherein the cathode is positioned on the side of the polishing/texturing material that engages the metallic surface of the workpiece.

3. The method according to claim 1, wherein the cathode is positioned on the side of the polishing/texturing material opposite from the surface that engages the metallic surface of the workpiece.

4. The method according to claim 1, and further comprising the step of temporarily holding the abrasive grains on the surface of the polishing/texturing material while carrying out electrolytic polishing and abrasive super-finishing by providing surface structures comprised of flocked fibers on the side of the polishing/texturing material that engages the metallic surface of the workpiece.

5. The method according to claim 1, and further comprising the step of temporarily holding the abrasive grains on the surface of the polishing/texturing material while carrying out electrolytic polishing and abrasive super-finishing by providing surface structures comprised of a porous polymer on the side of the polishing/texturing material that engages the metallic surface of the workpiece.

6. The method according to claim 1, wherein the polishing/texturing material has a backing of an electrically conductive material.

7. The method according to claim 1, wherein the polishing/texturing material has an electrical resistance across the thickness of the polishing/texturing material, excluding a backing, of at least $1 \times 10^4 \Omega$.

8. The method according to claim 1, wherein the polishing/texturing material is liquid permeable.

* * * * *